US011261577B2

(12) United States Patent
Lee et al.

(10) Patent No.: US 11,261,577 B2
(45) Date of Patent: Mar. 1, 2022

(54) SAFETY DEVICE FOR QUICK COUPLER

(71) Applicant: DAEMO ENGINEERING CO., LTD., Siheung-si (KR)

(72) Inventors: Seung Hwan Lee, Ulsan (KR); Su Ick Jang, Ulsan (KR)

(73) Assignee: DAEMO ENGINEERING CO., LTD., Siheung-si (KR)

( * ) Notice: Subject to any disclaimer, the term of this patent is extended or adjusted under 35 U.S.C. 154(b) by 410 days.

(21) Appl. No.: 16/469,779

(22) PCT Filed: Jan. 3, 2018

(86) PCT No.: PCT/KR2018/000118
§ 371 (c)(1),
(2) Date: Jun. 14, 2019

(87) PCT Pub. No.: WO2018/128385
PCT Pub. Date: Jul. 12, 2018

(65) Prior Publication Data
US 2020/0080577 A1   Mar. 12, 2020

(30) Foreign Application Priority Data

Jan. 5, 2017  (KR) .................. 10-2017-0001750
Jan. 5, 2017  (KR) .................. 10-2017-0001751

(51) Int. Cl.
*E02F 3/36*    (2006.01)
*F16B 1/00*    (2006.01)

(52) U.S. Cl.
CPC .......... *E02F 3/3618* (2013.01); *E02F 3/3622* (2013.01); *E02F 3/3663* (2013.01); *F16B 1/005* (2013.01)

(58) Field of Classification Search
None
See application file for complete search history.

(56) References Cited

U.S. PATENT DOCUMENTS

| 6,902,346 B2* | 6/2005 | Steig, Jr. | E02F 3/3618 37/468 |
| 7,648,305 B2* | 1/2010 | Beales | E02F 3/3618 403/322.1 |
| 2016/0201290 A1 | 7/2016 | O'Connor | |

FOREIGN PATENT DOCUMENTS

| KR | 10-0739341 B1 | 7/2007 |
| KR | 10-2011-0005057 A | 1/2011 |
| KR | 10-1210833 B1 | 12/2012 |
| KR | 10-2015-0093359 A | 8/2015 |
| KR | 10-1651856 B1 | 9/2016 |
| KR | 10-1665663 B1 | 10/2016 |

* cited by examiner

*Primary Examiner* — Michael S Lowe
(74) *Attorney, Agent, or Firm* — Novick, Kim & Lee, PLLC; Jae Youn Kim

(57) ABSTRACT

The present invention relates to a safety device for a quick coupler and, more particularly, to a safety device for a quick coupler, the safety device having an improved structure that is configured to improve the structure of a locking device, the locking device preventing the fixing hook from being arbitrarily released from a locking engagement, by using a safety plate that is laterally moved in a sliding manner by an elastic force of a DIE spring after a fixing hook and a first attachment pin are assembled together.

9 Claims, 15 Drawing Sheets

SAFETY DEVICE FOR QUICK COUPLER

TECHNICAL FIELD

The present invention relates to a safety device for a quick coupler and, more particularly, to a safety device for a quick coupler having structure that is configured to improve the structure of a locking device, wherein the locking device prevents the fixing hook from being arbitrarily released from a locking engagement by using a safety plate that is laterally moved in a sliding manner by an elastic force of a DIE spring after a fixing hook and a first attachment pin are assembled together.

BACKGROUND ART

Generally, heavy equipment such as an excavator used in the field of construction work or engineering work, is used for performing road work, water supply and sewerage work, building ground work, ground shaping work, and soil sampling work. The excavator performs work by selectively changing various attachments depending on uses of work.

Depending on the work, for example, digging work using a bucket, concrete building fracture work and rebar cutting work using a crusher, rock and concrete breaking work using a breaker, scrap metal and rock transporting work using a grabber, vertical shaft construction and water supply and sewage construction ground work using a clamshell bucket, the heavy equipment is designed to change various attachments so as to perform various types of work.

An attachment is normally attached to an arm of the excavator with having an attachable and detachable structure, in order to be replaced depending on uses of work. In recent years, a quick coupler in which a separate coupler is mounted to the arm of the excavator thereby allowing the attachment to be easily attached to the excavator, has been developed and is widely used.

The quick coupler is firmly mounted to the arm and a cylinder-side push link of the excavator by way of a pin, the pin being mounted to two positions at a quick coupler body, and the quick coupler is designed to engage the attachment with the excavator by a fixing hook and a hitch.

Therefore, by manipulating a lever of the excavator to attach/detach the quick coupler mounted to an end of the arm of the excavator to/from the bucket or the breaker, a user of the excavator can use the attachment easily.

Meanwhile, during work, as a means for preventing a risk in which the attachment is detached from the quick coupler due to hydraulic cylinder failure or damage in hydraulic hose, the quick coupler is provided with a safety device, for example, a safety pin to prepare for a safety accident.

However, when the attachment such as the bucket or the breaker is changed from the quick coupler, the user should manually perform operation of removing the safety pin from the mounted attachment or operation of attaching the safety pin after another attachment is mounted to the quick coupler. Thus, the attachment and detachment operations are difficult and inconvenient, and the operations take too much time.

For reference, in Korean Patent No. 10-0739341 "Attachment Coupler for Heavy Machinery Having Automatic Safety Device" (Registration Date: Jul. 9, 2007) as the related art, the attachment coupler has been designed such that a moving hook is supported in duplicate by a hydraulic cylinder and an automatic safety device cylinder. The automatic safety device cylinder is turned in loose state only when the hydraulic cylinder is normally released. However, a separate automatic safety device cylinder is needed in this case.

As another case of the related art, in Korean Patent No. 10-1210833 "Automatic Safety Device for Quick Coupler" (Registration Date: Dec. 5, 2012), a quick coupler is designed such that a hitch provided in an upper part of a fixing hook is moved in conjunction with movement of a slide-type operation hook, thereby preventing pin detachment. However, problems of hydraulic cylinder failure and hydraulic hose damage still remain, so reliability of the safety device is limited thereto.

In addition, as other case of the related art, in Korean Patent No. 10-1665663 "Double Safety Device for Quick Coupler" (Registration Date: Oct. 6, 2016), a quick coupler is designed such that an attachment pin is automatically prevented from being arbitrarily removed from a fixing hook, during engagement process of the quick coupler for coupling the heavy equipment attachment and the excavator. That is, a locking device may be automatically operated in conjunction with movement of a cylinder that moves a hitch in a sliding manner and an elastic force of first and second compression springs.

However, in the case of the conventional safety device of the fixing hook, the safety device has a complicated structure and maintenance of elements is not easy. Furthermore, the safety device prevents engagement between the fixing hook and the attachment pin from being arbitrarily released.

In addition, when the conventional locking device cannot be smoothly operated due to a complicated structure, a risk of safety accident exists.

DISCLOSURE

Technical Problem

Accordingly, the present invention has been made keeping in mind the above problems occurring in the prior art, and an object of the present invention is to provide a safety device for a quick coupler, the safety device having an improved structure that is configured to improve the structure of a locking device, the locking device preventing the fixing hook from being arbitrarily released from a locking engagement, by using a safety plate that is laterally moved by an elastic force of a DIE spring after a fixing hook and a first attachment pin are assembled together.

Another object of the present invention is to provide a safety device for a quick coupler, the safety device having an improved structure that is configured to improve the structure of a locking device, the locking device preventing the fixing hook from being arbitrarily released from a locking engagement, by using a stop block that is laterally moved in a sliding manner by first and second link members that are moved in conjunction with movement of a hitch to be disposed on an upper side of the fixing hook after a fixing hook and a first attachment pin are assembled together.

Technical Solution

In order to accomplish the above object, the present invention provides a safety device for a quick coupler, the safety device includes: a quick coupler body connected to an arm of an excavator; a fixing hook provided at a first side of the quick coupler body, engaged with a first attachment pin, and provided with a stopping protrusion having an opening-side end portion protruding upwardly; a hitch provided at a second side of the quick coupler body, and connected to a cylinder rod of a main-cylinder to be engaged with a second attachment pin when the cylinder rod performs forward operation; and a first locking means for preventing locking engagement between the fixing hook and the first attachment pin from being arbitrarily released. Wherein the first locking means includes: a first support plate fixed to the quick coupler body; a sub-cylinder mounted to the first support plate and in which a sub-rod is retracted; a moving plate having a first support step that is connected to the sub-rod and a safety plate at a lower surface of the moving plate, and disposed to be moveable in a sliding manner toward an upper side of the fixing hook; and at least one DIE-spring fixed to the first support plate by a support means, and transmitting an elastic force to allow the moving plate to be positioned at the upper side of the fixing hook.

The support means may include: a support bolt passing through the DIE-spring to be locked to the first support plate and to support a first end of the DIE-spring; and a locking step protruding from an upper surface of the moving plate, coupled to the support bolt that passes therethrough, and supporting a second end of the DIE-spring.

The DIE-spring may be configured of first and second DIE-springs which may be spaced apart from each other, and each DIE-spring may be a compression spring.

When the safety plate is positioned at the upper side of the fixing hook, a lower surface of the safety plate may be positioned at a height where the safety plate interferes with the first attachment pin along with the stopping protrusion so that the first attachment pin may be prevented from being released from engagement with the fixing hook.

The quick coupler body may be provided with a guide groove at opposite inner surfaces of the quick coupler body, respectively, the guide groove guiding sliding movement of the moving plate.

The safety device of the present invention may further include: a first elastic spring in which one end of the first elastic spring is supported by a base step provided in an outer circumference of the main-cylinder, for supplying an elastic force toward the hitch.

As another feature of the present invention, a safety device for a quick coupler includes: a quick coupler body connected to an arm of an excavator; a fixing hook provided at a first side of the quick coupler body, engaged with a first attachment pin, and provided with a stopping protrusion having an opening-side end portion protruding upwardly; a hitch provided at a second side of the quick coupler body, and connected to a rod member of the cylinder to be engaged with a second attachment pin when the rod member performs forward operation; and a second locking means for preventing engagement between the fixing hook and the first attachment pin from being arbitrarily released. Wherein the second locking means includes: a second support plate fixed to a first side of the quick coupler body; a support bolt in which one end portion of the support bolt is locked to the second support plate; a stop block having a second support step at an upper part of the stop block thereby allowing the support bolt to pass therethrough, with a blocking portion protruding downwardly from a lower part thereof; a support spring coupled to the support bolt, supported by a head portion of the support bolt and the second support step, and having an elastic force to push the stop block toward an upper side of the fixing hook; and a transport means for moving an outer cylinder block connected to a cylinder housing of the cylinder during clockwise rotation of the hitch, to move the stop block toward the upper side of the fixing hook depending on movement of the outer cylinder block.

The transport means may include: a frame pin coupled to the first side of the quick coupler body and coupled to an end of the cylinder housing to rotate the cylinder; a stopper fixed to the second side of the quick coupler body, and limiting rotational angle of the hitch when the rod member is retracted; the outer cylinder block covering outside of the cylinder housing, moved in a sliding manner toward the hitch from the frame pin when the stopper restricts rotation of the hitch due to the retracted rod member, and moved toward the frame pin when the rod member is extended; an inner cylinder block disposed to cover the rod member, and in which a first side of the inner cylinder block is connected to the hitch by way of a pin and a second side thereof is disposed inside the outer cylinder block; a first link member in which a first side of the first link member is connected to the outer cylinder block so that the first link member and the outer cylinder block are moved in conjunction with each other; and a second link member in which a first side of the second link member is connected to a second side of the first link member by a sliding pin and a second side thereof is integrally connected to the stop block.

When the stop block is positioned at the upper side of the fixing hook, a lower surface of the blocking portion may be positioned at a height at which the blocking portion interferes with the first attachment pin along with the stopping protrusion so that the first attachment pin may be prevented from being released from engagement with the fixing hook.

The quick coupler body may be provided with a guide groove at each of opposite inner surfaces of the quick coupler body, the guide groove supporting opposite portions of the stop block and guiding lateral sliding movement of the stop block.

The safety device may further include: a second elastic spring in which a first end of the second elastic spring is supported by a base step provided in an outer circumference of the cylinder housing and a second end thereof may be supported by the inner cylinder block, for supplying an elastic force toward the hitch.

Advantageous Effects

As described above, according to the present invention, in order to prevent locking engagement of the quick coupler for coupling the excavator and the heavy equipment attachment, the safety plate at the upper side of the fixing hook is laterally moved in the sliding manner by using the DIE spring and the sub-cylinder, thereby allowing separation of the first attachment pin to be restrained and unrestrained. Accordingly, as the safety plate at the lower side of the moving plate is laterally moved, the safety device can be locked and unlocked, the safety device can be used with simple movement, main causes of element failure can be reduced, and product safety can be improved.

When the safety plate is positioned at the upper side of the fixing hook, the lower surface of the safety plate is positioned at a height where the safety plate interferes with the first attachment pin along with the stopping protrusion so that the first attachment pin is not separated from the fixing hook. Thus, the first attachment pin can access normally through the opening of the fixing hook, but after the safety plate is moved toward the right side to be positioned at the upper side of the fixing hook, it is possible to prevent the first attachment pin to be separated from the fixing hook.

The support means of the present invention includes: the support bolt locked to the first support plate and passing though the DIE-spring for supporting the first end portion of the DIE-spring; and a locking step protruding from the upper surface of the moving plate, through which the support bolt passes, and supporting the second end portion of the DIE-spring. By using the support means, the DIE-spring can be easily and conveniently supported.

In addition, the guide groove is provided in each of the opposite inner surfaces of the quick coupler body to guide the sliding movement of the moving plate. Thus, when the moving plate is laterally moved in the sliding manner, the guide groove allows the moving plate to be smoothly moved by supporting each of the opposite portions of the moving plate.

BEST MODE

Figure 1:
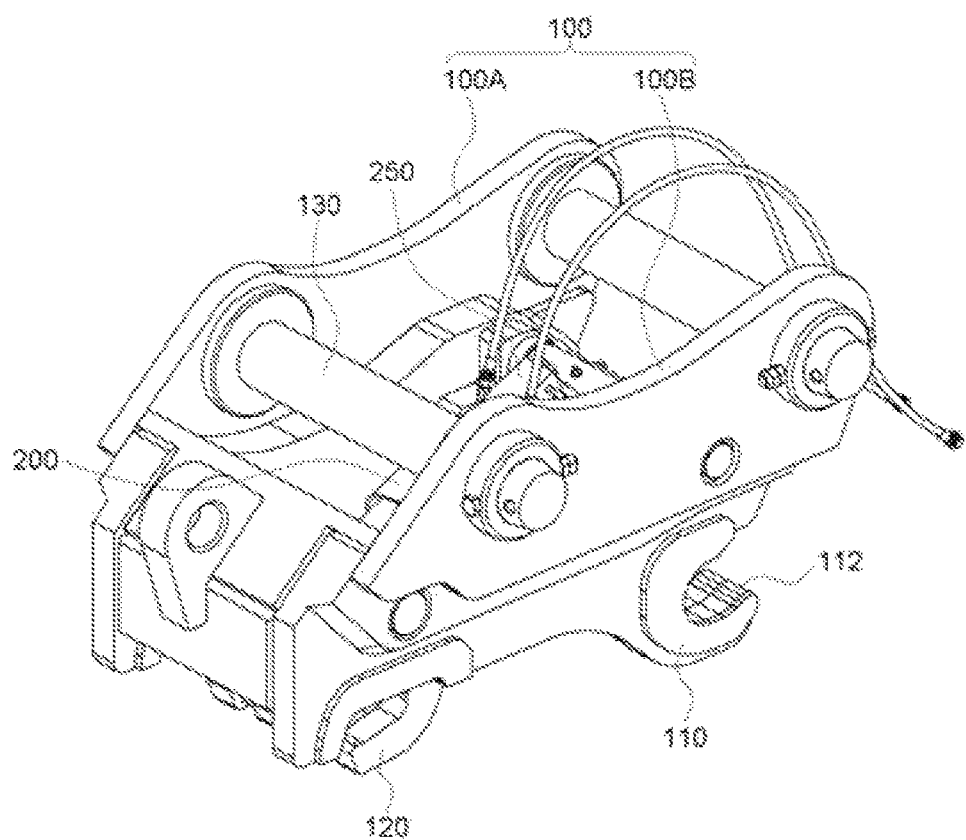
FIG. 1 is an exterior perspective view showing a quick coupler in which a first embodiment of a safety device for a quick coupler according to the present invention is applied.

According to a first embodiment of the present invention, as a safety device for a quick coupler will be described with reference to FIGS. 1 to 4, the safety device for a quick coupler includes: the quick coupler body 100 connected to an arm of an excavator; a fixing hook 110 provided at a first side of the quick coupler body 100, coupled to a first attachment pin 10, and provided with a stopping protrusion 112 having an opening-side end portion protruding upwardly; a hitch 120 provided at a second side of the quick coupler body 100, and connected to a cylinder rod 210 of a main-cylinder 200 to be coupled to a second attachment pin 20 when the cylinder rod 210 performs forward operation; and a first locking means 300 for preventing locking engagement between the fixing hook 110 and the first attachment pin 10 from being arbitrarily released. The first locking means 300 includes: a first support plate 310 fixed to the quick coupler body 100; a sub-cylinder 320 mounted to the first support plate 310 and in which a sub-rod 322 is retracted; a moving plate 330 provided with a first support step 332 connected to the sub-rod 322 and provided with a safety plate 340 at a lower surface of the moving plate 330, and disposed to be moveable in a sliding manner toward a upper side of the fixing hook 110; and at least one DIE-spring 350 fixed to the first support plate 310 by a support means 400, and supplying an elastic force to allow the moving plate 330 to be positioned at the upper side of the fixing hook 110.

Referring to FIG. 1, the quick coupler body 100 is provided with a left side portion 100A and a right side portion 100B that are symmetrically disposed and spaced apart from each other. The main-cylinder 200 is disposed between the left side portion 100A and the right side portion 100B.

The left side portion 100A and the right side portion 100B are connected to each other by a connecting pin 130.

In addition, the hitch 120 rotated due to operation of the cylinder rod 210 of the main-cylinder 200 is provided in a left side of the quick coupler body 100. The fixing hook 110 having an opening toward the outside is provided in a right side of the quick coupler body 100.

Figure 2:
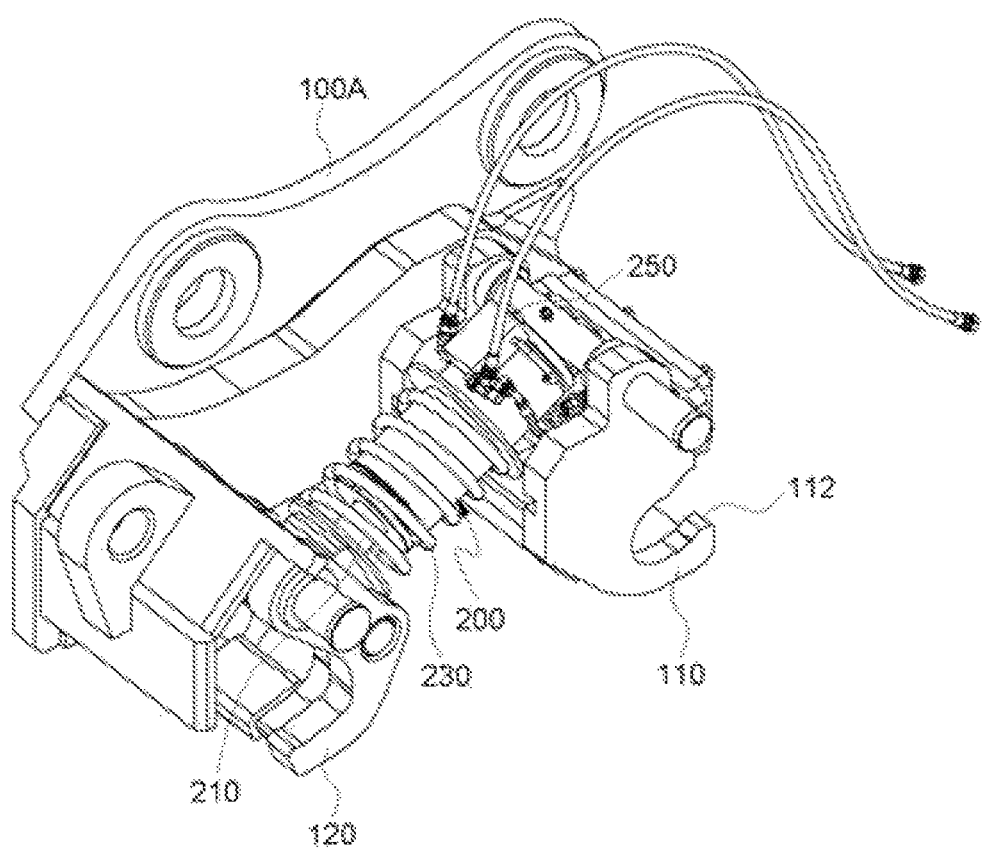
FIG. 2 is a perspective view showing the first embodiment of the safety device for a quick coupler of the present invention.

Referring to FIG. 2, the cylinder rod 210 of the main-cylinder 200 is connected to the hitch 120, and the hitch 120 is rotated on an axis of a hinge pin according to operation of the main-cylinder 200.

The main-cylinder 200 is provided with a check valve 250 for preventing back flow when hydraulic pressure is supplied to the main-cylinder 200.

In addition, even when hydraulic pressure supply to the main-cylinder 200 is blocked, the main-cylinder 200 is provided with a first elastic spring 230, so that an elastic force is transmitted to the hitch 120 for preventing the hitch 120 from being released from engagement with the second attachment pin 20.

The first elastic spring 230 adopts a compression spring, the compression spring being configured such that one end of the spring is supported by a base step provided in an outer circumference of the main-cylinder 200 and transmitting an elastic force to the hitch 120.

Figure 3:
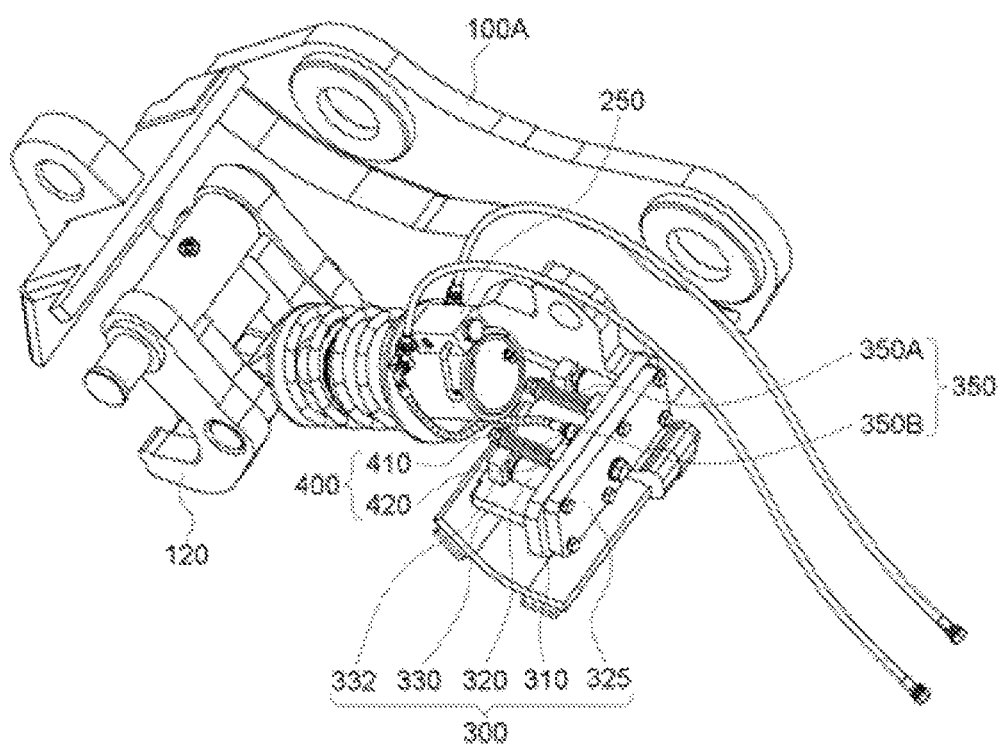
FIG. 3 is a perspective view showing a configuration in FIG. 2 taken at another angle.

Referring to FIG. 3, the first support plate 310 is integrally connected to an inner surface of the quick coupler body 100. At an outer surface of the first support plate 310, a flow path block 325 is fixed thereto by way of a bolt and supplies hydraulic pressure to the sub-cylinder 320 via a flow path of flow-path block 325.

In addition, the first support plate 310 is coupled to the sub-cylinder 320 so that the sub-cylinder 320 is fixed.

The support means 400 includes: a support bolt 410 passing through the inside of the DIE-spring 350 to support a first end of the DIE-spring 350, and locked to the first support plate 310; and a locking step 420 protruding upwardly from the moving plate 330, coupled to the support bolt 410 that passes therethrough, and supporting a second end of the DIE-spring 350.

The support bolt 410 passes through the locking step 420 protruding upwardly from the moving plate 330, and then is fixed to the first support plate 310.

The first end of the DIE-spring 350 is supported by the locking step 420, and the second end thereof is supported by a head portion of the support bolt 410.

The DIE-spring 350 is configured of first and second DIE-springs 350A and 350B which are disposed to be spaced apart from each other, and the DIE-spring 350 is a compression spring.

Figure 4:
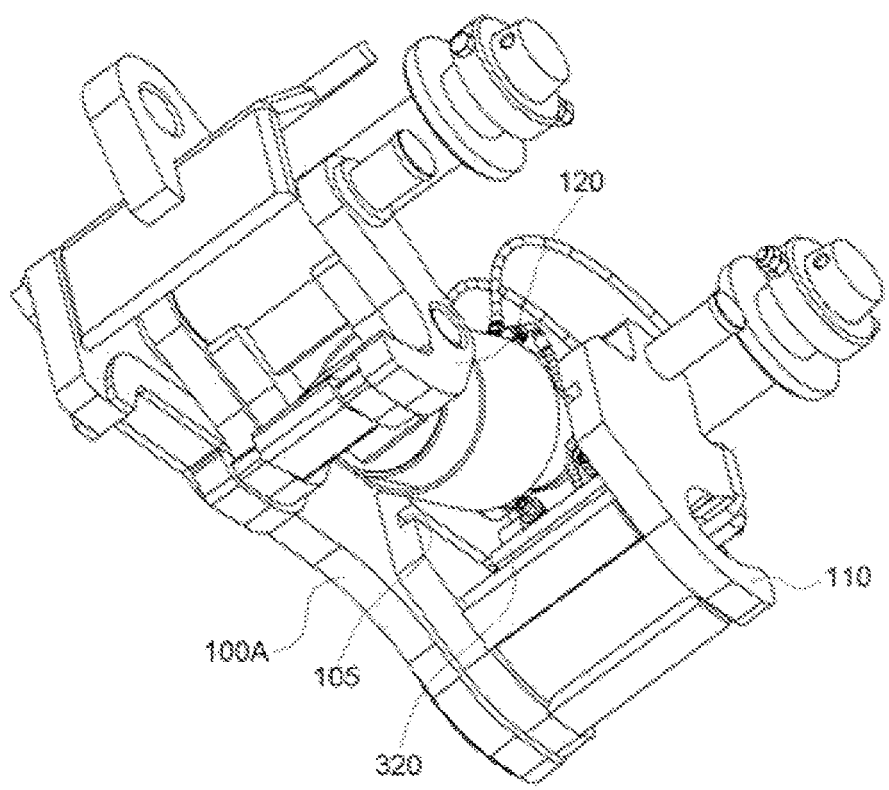
FIG. 4 is a bottom perspective view of FIG. 2.

Referring to FIG. 4, on each of inner surfaces of the left side portion 100A and the right side portion 100B, a guide groove 105 is provided to support opposite sides of the moving plate 330 and guide lateral sliding movement of the moving plate 330.

Thus, opposite ends of the moving plate 330 are supported by the guide groove 105, and the moving plate 330 is laterally moved by the sub-cylinder 320 and the DIE-spring 350.

Figure 5:
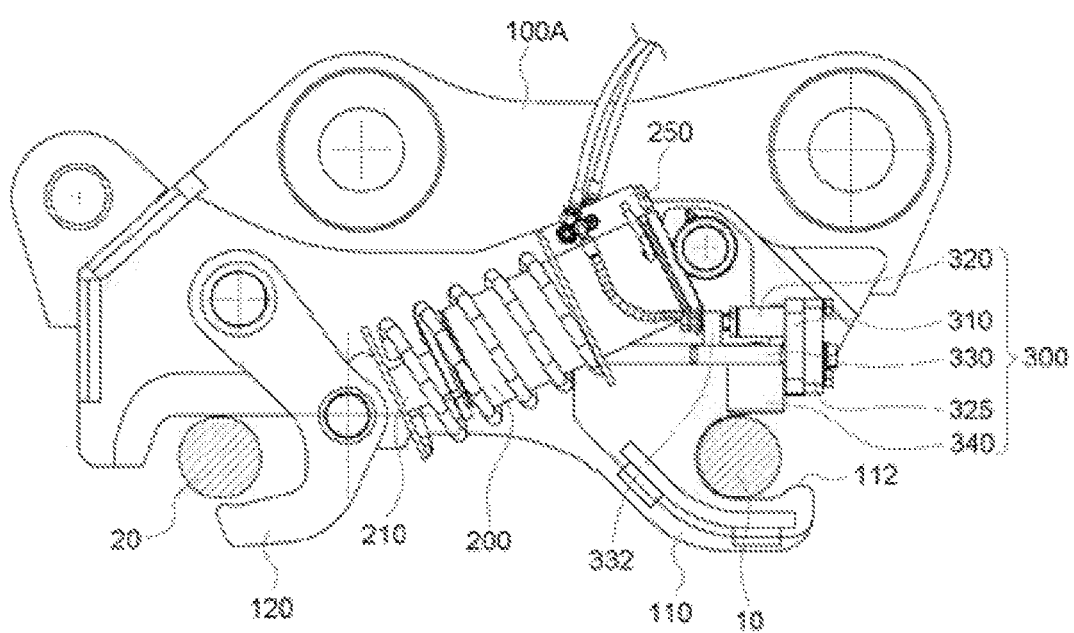
FIGS. 5 and 6 are views showing use states of a sub-cylinder and a DIE-spring after a safety plate is positioned at an upper side of a fixing hook, while a moving plate and the safety plate are moved in a right direction.
Figure 6:
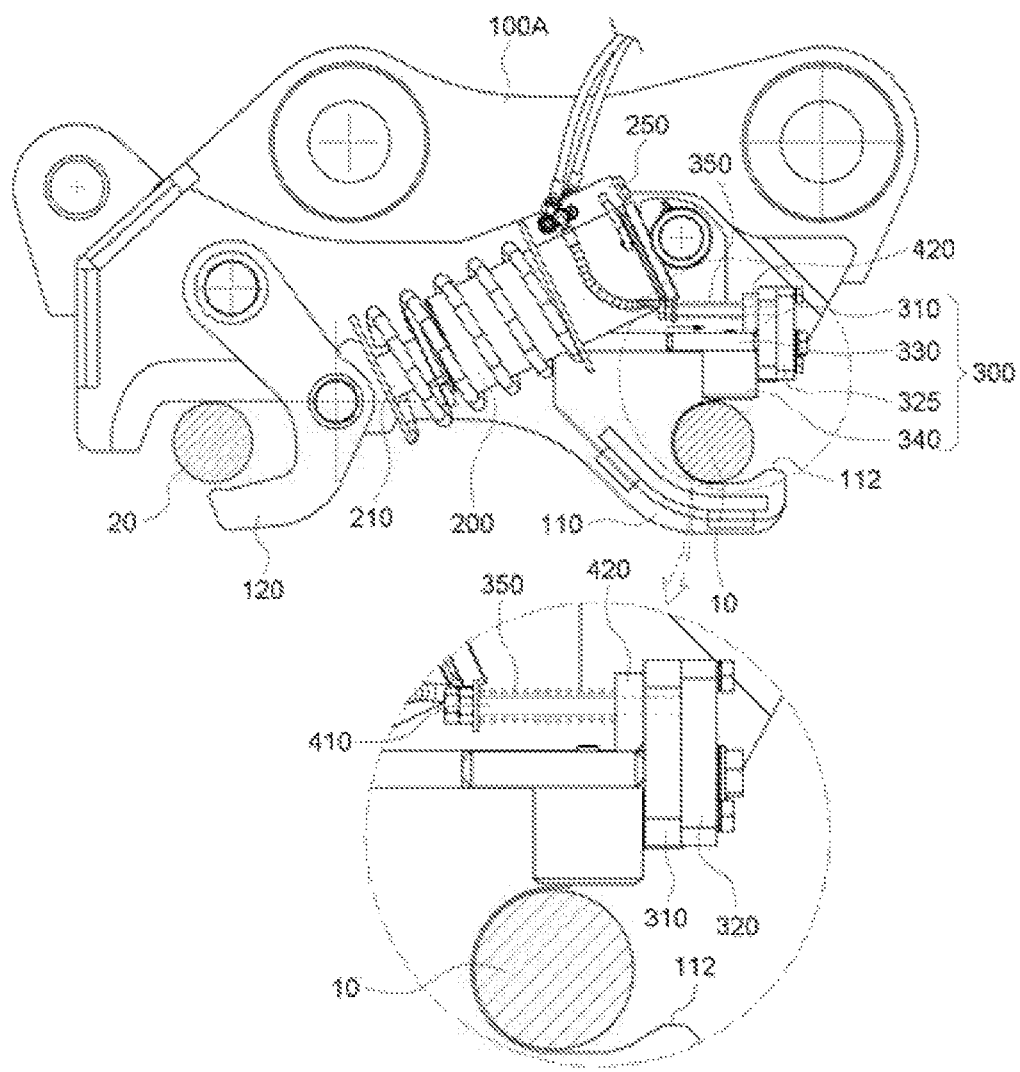

In the present invention having the above-described configuration, when the safety plate 340 is moved toward the left side after the first attachment pin 10 is engaged with the fixing hook 110, the DIE-spring 350 maintains a compressed state. Then, as hydraulic pressure supply to the sub-cylinder 320 is blocked, an elastic restoring force of the DIE-spring 350 pushes the locking step 420 toward the right side, thereby allowing the moving plate 330 to be moved toward the right side in the sliding manner, as shown in FIGS. 5 and 6.

Here, the safety plate 340 is moved in conjunction with rightward sliding movement of the moving plate 330 and then is positioned at an upper side of the opening of the fixing hook 110.

When the safety plate 340 is positioned at the upper side of the fixing hook 110, a lower surface of the safety plate 340 is positioned at a height at which the safety plate interferes with the first attachment pin 10 along with the stopping protrusion 112. Thus, the first attachment pin 10 is prevented from being released from engagement with the fixing hook 110.

That is, since a space between the lower surface of the safety plate 340 and the stopping protrusion 112 is smaller than an outer diameter of the first attachment pin 10, the first attachment pin 10 may be prevented from being released from engagement with the fixing hook 110.

Figure 9:
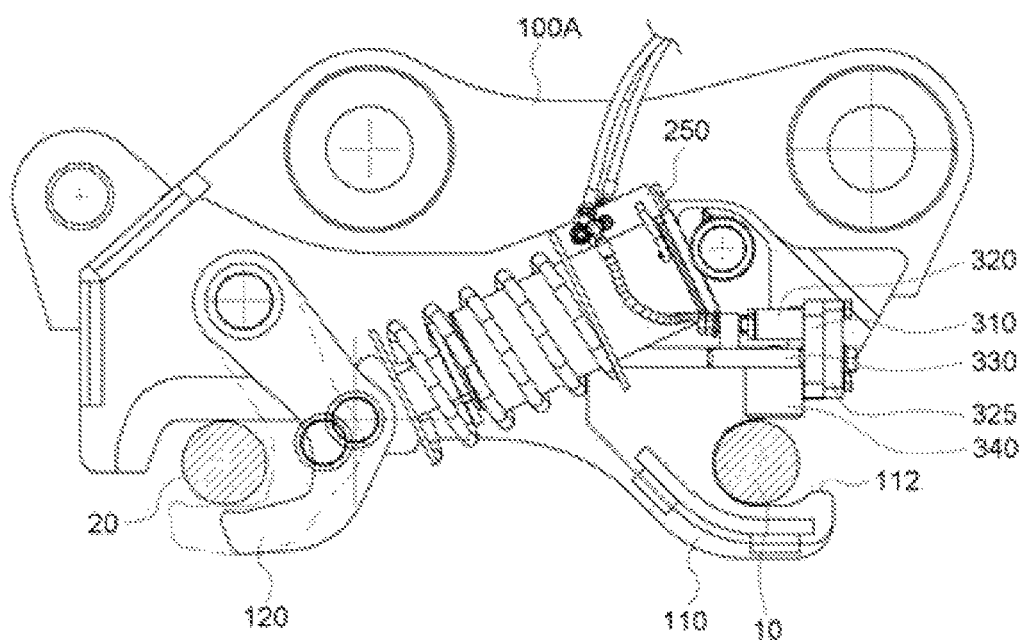
FIG. 9 is a view of a use state showing coupling the quick coupler and a heavy equipment attachment by engaging a hitch of the first embodiment of the present invention and a second attachment pin.

As shown in FIG. 9, as the hitch 120 is rotated toward the second attachment pin 20 on the axis of the hinge pin 122 by the main-cylinder 200, the hitch 120 and the second attachment pin 20 are in the locking engagement state.

Thus, even when the locking engagement between the hitch 120 and the second attachment pin 20 is released due to failure of the check valve 250, since the safety plate 340 is positioned at the upper side of the fixing hook 110, the first attachment pin 10 is prevented from being released from the engagement with the fixing hook 110. Thus, coupling between a heavy equipment attachment and the excavator can be maintained.

Figure 7:
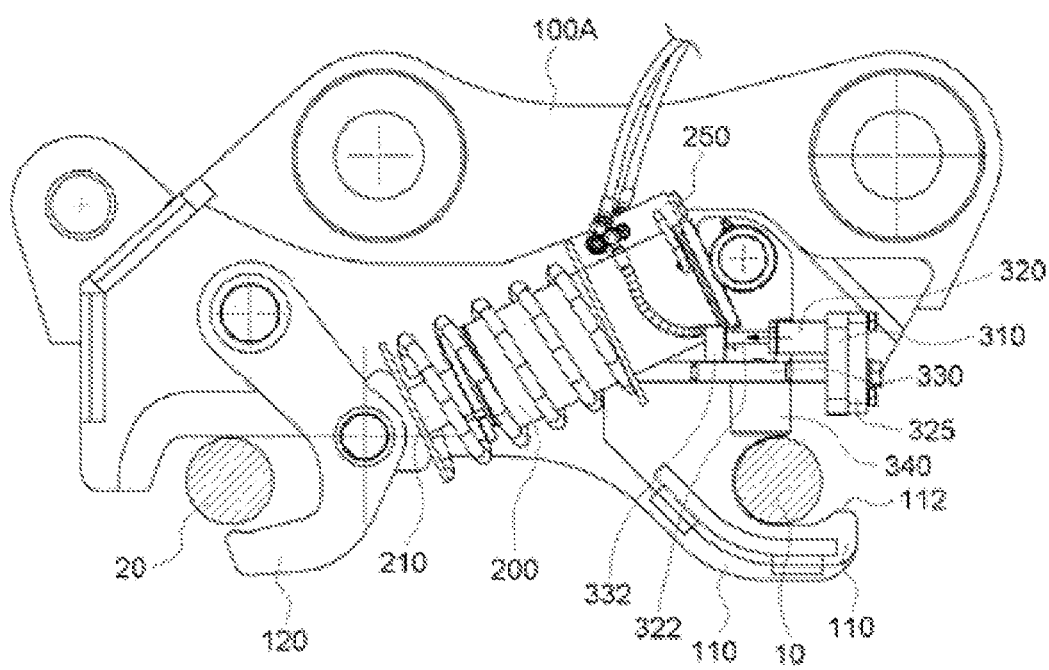
FIGS. 7 and 8 are views showing use states of the sub-cylinder and the DIE-spring after the safety plate is removed from an upper side of the fixing hook, while the moving plate and the safety plate are moved in a left direction.
Figure 8:
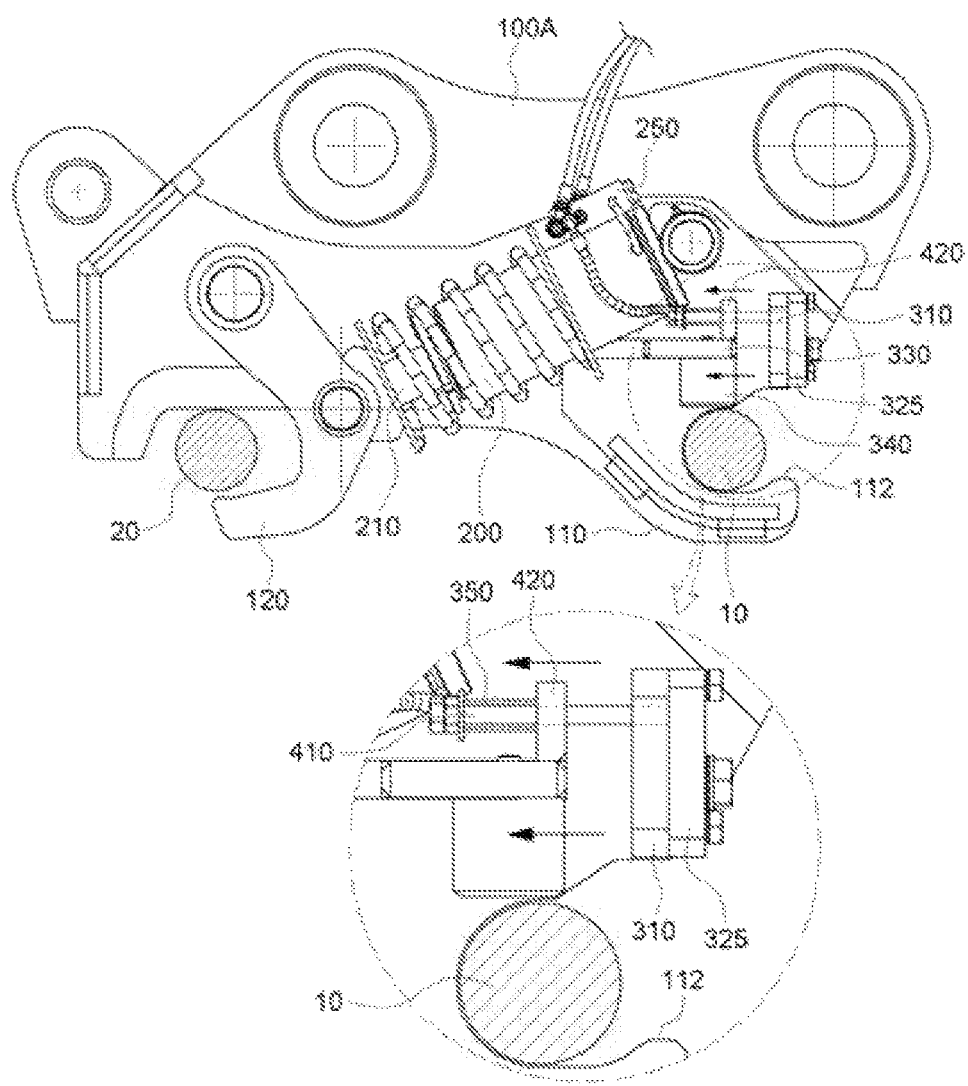

When the engagement is released so as to separate the excavator from the heavy equipment attachment, as shown in FIGS. 7 and 8, by supplying hydraulic pressure to the sub-cylinder 320 via the check valve 250, the sub-rod 322 is extended and pushes the first support step 332 toward the left side in the accompanying drawings. Therefore, as the moving plate 330 is moved toward the left side in the sliding manner, the safety plate 340 leaves the upper side of the fixing hook 110.

The DIE-spring 350 maintains the compressed state due to the locking step 420 that is moved in conjunction with movement of the moving plate 330.

For this reason, the first attachment pin 10 may be pulled out in an upward diagonal direction of the stopping protrusion 112 that is provided at the opening of the fixing hook 110, so it is possible to separate the first attachment pin 10 from the fixing hook 110.

Thereafter, when hydraulic pressure supply to the sub-cylinder 320 is blocked, the moving plate 330 is moved toward the right side and positioned at the upper side of the fixing hook 110 by an elastic restoring force of the DIE-spring 350. Thus, the safety plate 340 restrains the first attachment pin 10 so that the first attachment pin 10 is prevented from being removed through the upper side of the fixing hook 110.

According to the first embodiment of the present invention as described above, in order to prevent coupling between the excavator and the heavy equipment attachment from being arbitrarily released, the safety device of the present invention uses the DIE-spring 350 and the sub-cylinder 320. The DIE-spring 350 and the sub-cylinder 320 are operated to move the safety plate 340 toward the upper side of the fixing hook 110 in the sliding manner, so that the first attachment pin 10 may be restrained and be unrestrained. Therefore, since the safety device can be locked and unlocked by moving the safety plate 340 provided in the lower side of the moving plate 330 in a lateral direction, it is possible to use the safety device by simple operation, with reducing the causes of element failure, and with improving product safety.

When the safety plate 340 is positioned at the upper side of the fixing hook 110, the lower surface of the safety plate 340 is positioned at a height where the safety plate 340 interferes with the first attachment pin 10 along with the stopping protrusion 112, so that the first attachment pin 10 is not separated from the fixing hook 110. Normally, the first attachment pin 10 is accessible through the opening of the fixing hook 110, but after the safety plate 340 is moved toward the right side to be positioned at the upper side of the fixing hook 110, the first attachment pin 10 can be prevented from being released from engagement with the fixing hook 110.

In addition, the support means 400 of the present invention is fixed to the first support plate 310 and is configured of the support bolt 410 and the locking step 420. The support bolt 410 passes through the inside of the DIE-spring 350 so as to support the first end of the DIE-spring 350. The locking step 420 protrudes from the upper surface of the moving plate 330, is engaged with the penetrating support bolt 410, and supports the second end of the DIE-spring 350. Accordingly, the support means 400 can support the DIE-spring 350 simply and easily.

In addition, the first embodiment of the present invention is provided with the guide groove 105 for guiding the sliding movement of the moving plate 330, at the opposite side surfaces which are the left side portion 100A and the right side portion 100B of the quick coupler body 100, respectively. Therefore, when the moving plate 330 is laterally moved in the sliding manner, the guide groove 105 supports the opposite portions of the moving plate 330 thereby allowing the moving plate 330 to be smoothly moved.

Hereinbelow, a second embodiment of the present invention will be described. In the following description and drawings, when some elements of the second embodiment are the same as the elements of the above-described first embodiment, the same reference numerals will be used therein, and duplicate description will be omitted.

The Second Embodiment

The second embodiment of a safety device for a quick coupler according to the present invention will be described with reference to FIGS. 10 to 13. The safety device according to the second embodiment includes: the quick coupler body 100 connected to the arm of the excavator; the fixing hook 110 provided at the first side of the quick coupler body 100, coupled to the first attachment pin 10, and provided with the stopping protrusion 112 having the opening-side end portion protruding upwardly; the hitch 120 provided at the second side of the quick coupler body 100, and connected to a rod member 1220 of a cylinder 1200 so as to be engaged with the second attachment pin 20 when the rod member 1220 performs the forward operation; and a second locking means 1300 for preventing engagement between the fixing hook 110 and the first attachment pin 10 from being arbitrarily released. The second locking means 1300 includes: a second support plate 1310 fixed to the first side of the quick coupler body 100; a support bolt 1320 in which one end portion of the support bolt 1320 is locked to the second support plate 1310; a stop block 1330 having a second support step 1332 at an upper part thereof to allow the support bolt 1320 to pass therethrough, with a blocking portion 1334 protruding downwardly from a lower part of the stop block 1330; a support spring 1340 coupled to the support bolt 1320, supported by a head portion of the support bolt 1320 and the second support step 1332, and having an elastic force to push the stop block 1330 toward the upper side of the fixing hook 110; and a transport means 1400 moving an outer cylinder block 1430 connected to a cylinder housing 1210 of the cylinder 1200 when the hitch 120 is rotated clockwise, thereby allowing the stop block 1330 to be moved toward the upper side of the fixing hook 110 depending on movement of the outer cylinder block 1430.

Figure 10:
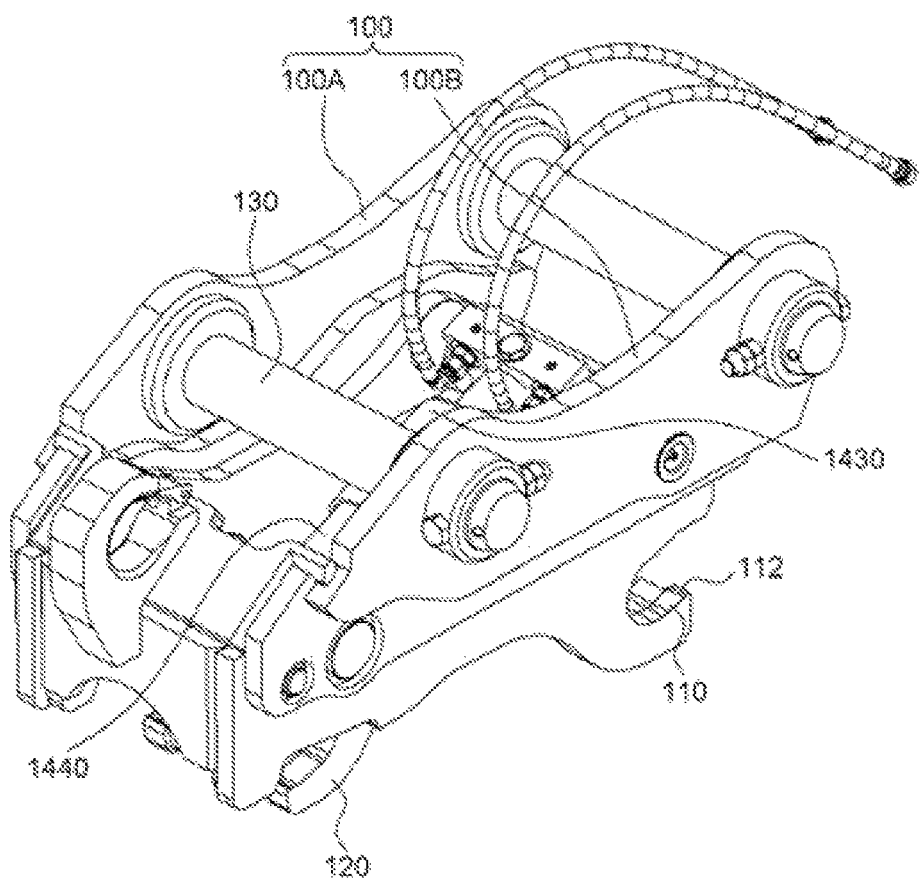
FIG. 10 is an exterior perspective view showing a quick coupler in which a second embodiment of a safety device for a quick coupler according to the present invention is applied.

Referring to FIG. 10, the quick coupler body 100 is configured of the left side portion 100A and the right side portion 100B that are symmetrically disposed and spaced apart from each other. The cylinder 1200 is disposed in the outer cylinder block 1430 provided between the left side portion 100A and the right side portion 100B.

The left side portion 100A and the right side portion 100B are connected by the connecting pin 130.

In addition, on the left side of the quick coupler body 100, the hitch 120 provided rotatably by operation of the rod member 1220 of the cylinder 1200 is provided, and on the right side of the quick coupler body 100, the fixing hook 110 having the opening toward the outside.

Figure 13:
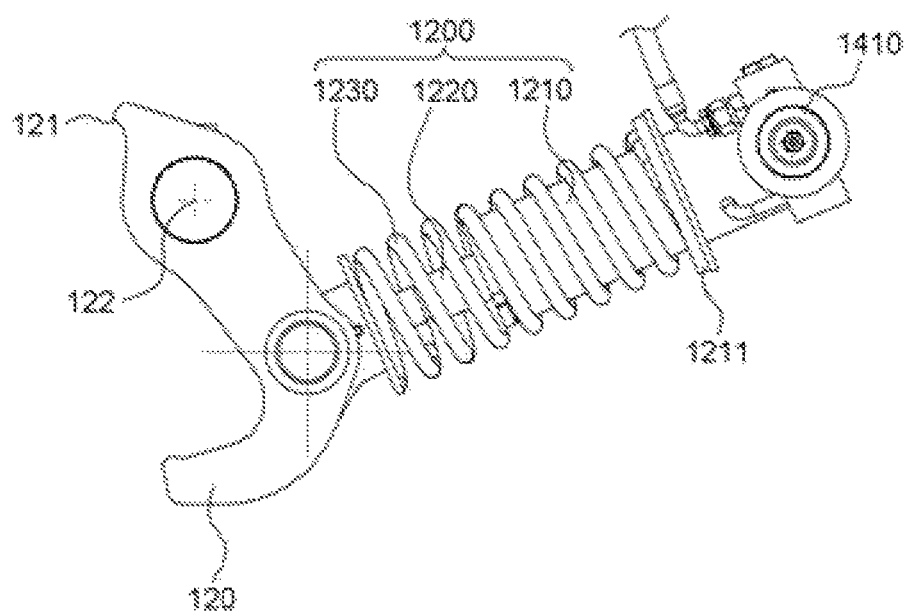
FIG. 13 is a front view showing a cylinder structure in which a cylinder block of the present invention is omitted.

Referring to FIG. 13, the cylinder 1200 includes the cylinder housing 1210 provided rotatably while a first side of the cylinder housing 1210 is coupled to the quick coupler body 100 by way of a pin, and the rod member 1220 extended and retracted at a second side of the cylinder housing 1210 to be accessible to the outside.

The rod member 1220 of the cylinder 1200 is connected to the hitch 120. The hitch 120 is rotated on the axis of the hinge pin 122 depending on movement of the cylinder 1200, the hinge pin 122 being coupled to the second side of the quick coupler body 100.

In addition, the cylinder 1200 is provided with a second elastic spring 1230 for supplying an elastic force to the hitch 120 even when hydraulic pressure is removed. Thus, the second attachment pin 20 is prevented from being released from engagement with the hitch 120.

The second elastic spring 1230 adopts the compression spring. One end of the compression spring is supported by a base step 1211 provided in an outer circumference of the cylinder housing 1210, and the compression spring transmits an elastic force toward the hitch 120.

Figure 11:
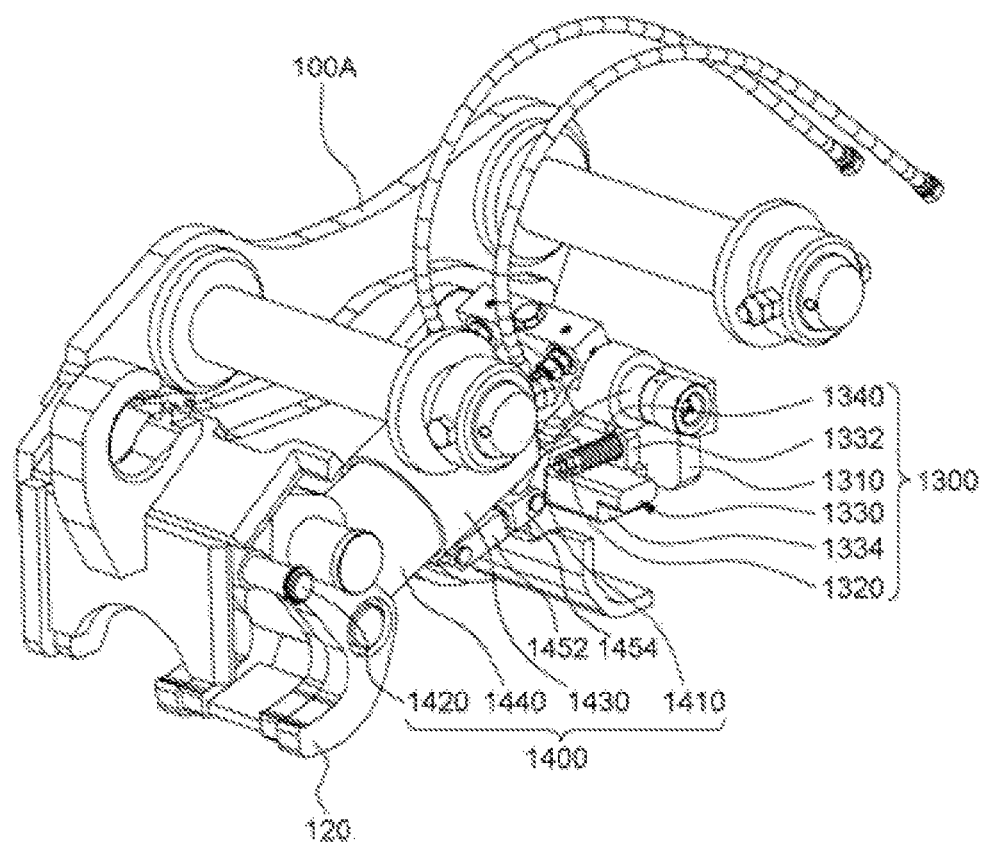
FIG. 11 is a perspective view showing the second embodiment of the safety device for the quick coupler according to the present invention.

Referring to FIG. 11, the transport means 1400 includes: a frame pin 1410 coupled to the first side of the quick coupler body 100 and coupled to an end of the cylinder housing 1210 by way of a pin to rotate the cylinder 1200; a stopper 1420 fixed to the second side of the quick coupler body 100 and limiting rotational angle of the hitch 120 when the rod member 1220 is retracted; the outer cylinder block 1430 covering an outer surface of the cylinder housing 1210, moved in the sliding manner toward the hitch 120 from the frame pin 1410 when rotation of the hitch 120 is restricted due to the compression of the rod member 1220, and moved toward the frame pin 1410 when the rod member 1220 is extended; an inner cylinder block 1440 provided to cover the rod member 1220, having a first end of the inner cylinder block 1440 connected to the hitch 120 by way of a pin and a second end thereof disposed in the outer cylinder block 1430; a first link member 1452 in which a first side of the first link member 1452 is connected to the outer cylinder block 1430 so that the first link member 1452 and the outer cylinder block 1430 are moved in conjunction with each other; a second link member 1454 having a first end connected to a second member of the first link member 1452 and a second end integrally connected to the stop block 1330; and a sliding pin 1455 for connecting between the first link member 1452 and the second link member 1454 and adjusting space between the first link member 1452 and the second link member 1454 that is variable depending on movement of the outer cylinder block 1430.

The support bolt 1320 is fixed to the second support plate 1310 by penetrating the second support step 1332 of the stop block 1330.

A first end of the support spring 1340 is supported by the second support step 1332 and a second end thereof is supported by the head portion of the support bolt 1320.

The support spring 1340 is provided with a plurality of compression springs spaced from each other.

The second support plate 1310 is fixed to be integrally connected to the inner surface of the quick coupler body 100.

Figure 12:
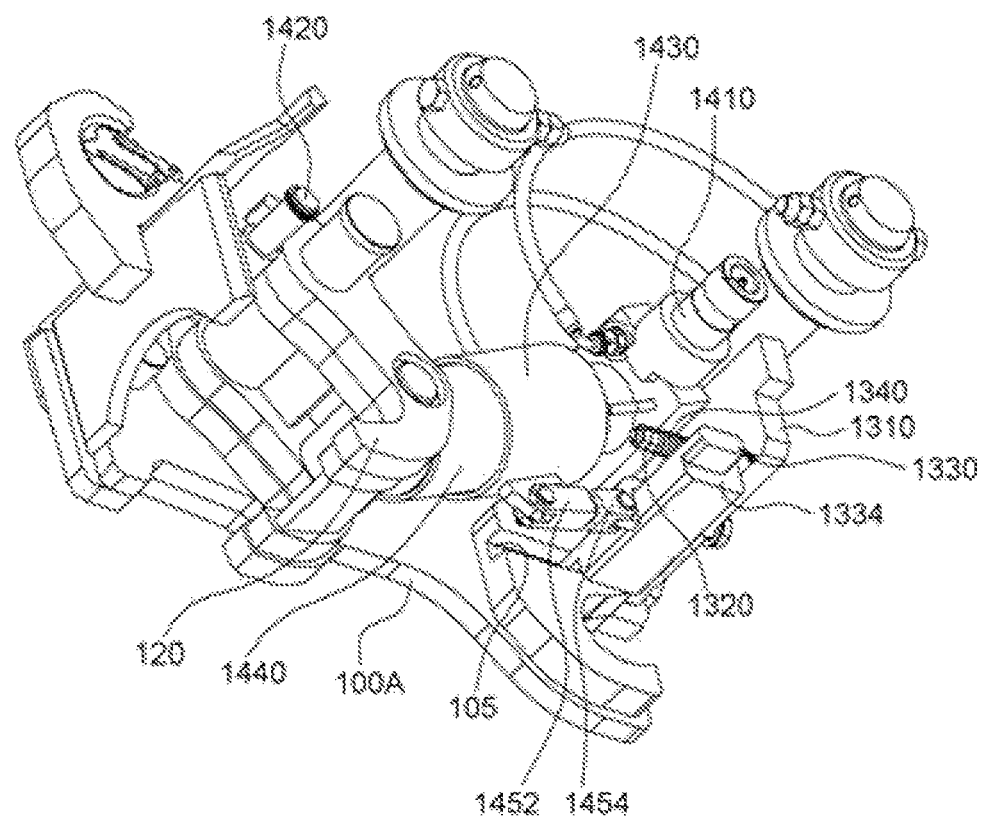
FIG. 12 is a perspective view showing a configuration in FIG. 11 taken at a bottom angle.

Referring to FIG. 12, on each of the inner surfaces of the left side portion 100A and the right side portion 100B, the guide groove 105 is formed into a concave shape and supports opposite sides of the stop block 1330 so as to guide the lateral sliding movement of the stop block 1330.

Accordingly, the stop block 1330 has a structure in which the stop block 1330 is laterally moveable while the opposite sides of the stop block 1330 are supported by the guide groove 105.

Figure 14:
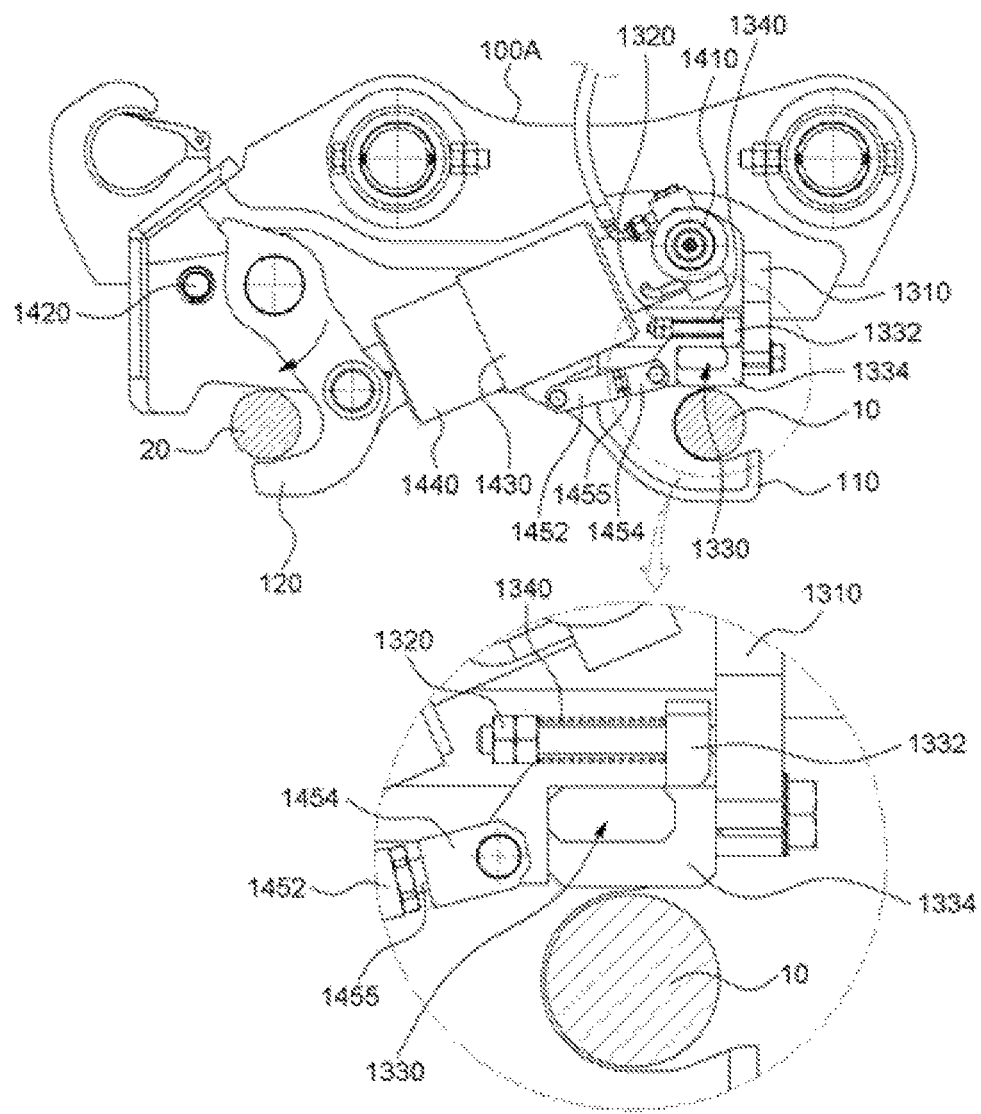
FIG. 14 is a view of use state showing the safety device in a locked state in which a stop block of the present invention is moved upward a fixing hook.

In the second embodiment having the above-described configuration, as a switch for quick coupler engagement is operated after the first attachment pin 10 is engaged with the fixing hook 110, hydraulic pressure is supplied to the cylinder 1200 and the rod member 1220 is extended as shown in FIG. 14. Then, the hitch 120 is rotated clockwise on the axis of the hinge pin 122 for engagement with the second attachment pin 20 then is engaged with the second attachment pin 20. Thus, the outer cylinder block 1430 is moved toward the frame pin 1410 to move the first and second link members 1452 and 1454 in the diagonal direction, so that the stop block 1330 is moved toward the upper side of the fixing hook 110.

The support spring 1340 pushes the second support step 1332 by an elastic restoring force while an end portion of the support spring 1340 is engaged with the second support plate 1310. Thus, the support spring 1340 provides an elastic force for pushing the stop block 1330 toward the upper side of the fixing hook 110 in the lateral direction.

In addition, the blocking portion 1334 of the stop block 1330 is positioned at the upper side of the opening of the fixing hook 110. When the stop block 1330 is positioned at the upper side of the fixing hook 10, the lower surface of the blocking portion 1334 is positioned at a height where the blocking portion 1334 interferes with the first attachment pin 10 along with the stopping protrusion 112, so that the first attachment pin 10 is prevented from being released from engagement with the fixing hook 110.

Accordingly, since space between the lower surface of the stop block 1330 and the stopping protrusion 112 is smaller than an outer diameter of the first attachment pin 10, the stop block 1330 functions as the safety device for preventing the first attachment pin 10 engaged with the fixing hook 110 from being released from engagement with the fixing hook 110.

For this reason, after the fixing hook 110 and the first attachment pin 10 are engaged with each other and the hitch 120 and the second attachment pin 20 are engaged with each other, engagements can be stably maintained by the second elastic spring 1230 of the compression spring and the support spring 1340 so that the engagements are not released. Furthermore, even when hydraulic pressure failure occurs and engagement between the hitch 120 and the second attachment pin 20 is released, since the stop block 1330 is positioned at the upper side of the fixing hook 110, the first attachment pin 10 can be prevented from being released from the engagement with the fixing hook 110. Therefore, the engagement between the heavy equipment attachment and the excavator can be maintained.

Figure 15:
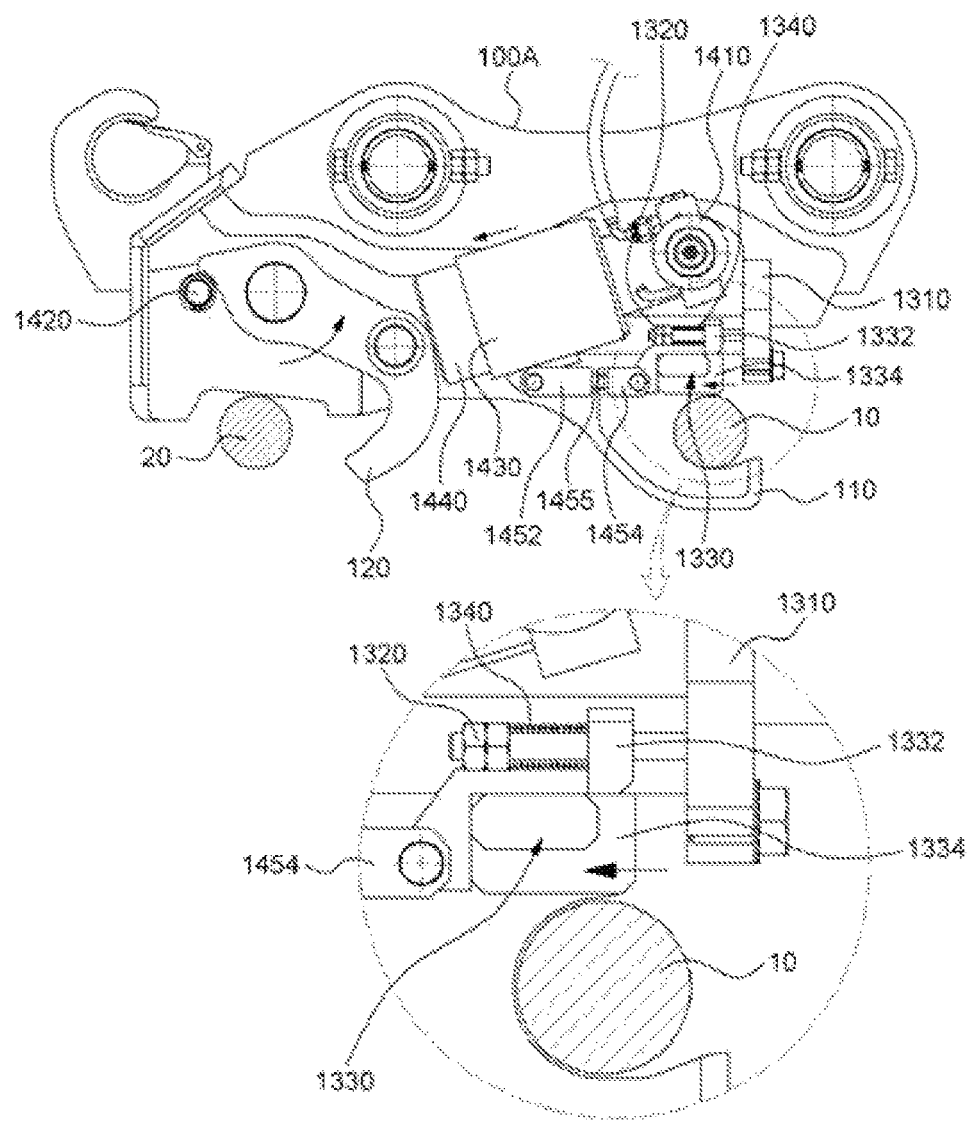
FIG. 15 is a view of use state showing the safety device being in a released state, in which the stop block of the present invention is moved in a left direction and then an outer cylinder block and first and second link members are moved in conjunction with movement of a hitch to release the safety device.

Meanwhile, when the safety device of the present invention is released for separating the excavator and the heavy equipment attachment, as shown in FIG. 15, as the rod member 1220 is retracted, the rod member 1220 is retracted and inserted into the cylinder housing 1210 to allow the hitch 120 to be rotated counterclockwise on the axis of the hinge pin 122. Then, as a front end portion 121 of the hitch 120 is in contact with the stopper 1420 during rotation of the hitch 120, the hitch 120 is no longer allowed to be rotated. In this state, when the rod member 1220 is further retracted, the cylinder housing 1210 and the outer cylinder block 1430 slide toward the hitch 120 by extra stroke of the rod member 1220. Then, as the outer cylinder block 1430 and the inner cylinder block 1440 are overlapped, the first link member 1452 connected to the outer cylinder block 1430 is pulled.

Thereafter, as a tensile force is transmitted to the second link member 1454 via the first link member 1452, the stop block 1330 connected to the second link member 1454 is moved in the sliding manner from the upper side of the fixing hook 110 in the left direction in the FIG. 15, and the safety device is released.

Here, the stop block 1330 is laterally moved while being supported by the guide groove 105.

For this reason, as the outer cylinder block 1430 and the first and second link members 1452 and 1454 are moved together in conjunction with movement of the hitch 120, the safety device is released and the heavy equipment attachment and the excavator can be separated from each other.

According to the second embodiment of the present invention as described above, in order to prevent locking engagement of the quick coupler for coupling the excavator and the heavy equipment attachment from being arbitrarily released, the stop block 1330 is laterally moved toward the upper side of the fixing hook 110 in the sliding manner, by using the outer cylinder block 1430 and the first and second link members 1452 and 1454 in conjunction with the rotation of the hitch 120, so that the first attachment pin 10 can be restrained and unrestrained. Accordingly, the safety device can be locked and unlocked with the configuration in which the stop block 1330 is laterally moved, so that it is possible to simplify the use of the safety device, reduce main causes of element failure, and improve product safety.

When the stop block 1330 is moved at the upper side of the fixing hook 110, the lower surface of the blocking portion 1334 of the present invention is positioned at a height at which the blocking portion 1334 interferes with the first attachment pin 10 along with the stopping protrusion 112, so that the first attachment pin 10 is prevented from being released from engagement with the fixing hook 110. Therefore, the first attachment pin 10 is normally accessible through the opening of the fixing hook 110, but after the stop block 1330 is moved toward the right side to be positioned at the upper side of the fixing hook 110, the first attachment pin 10 is prevented from being released from engagement with the fixing hook.

In addition, the safety device of the second embodiment of the present invention is provided with the guide groove 105 that is formed on each of the opposite inner surfaces of the left side portion 100A and the right side portion 100B of the quick coupler body 100. Thus, the opposite portions of the stop block 1330 are supported by opposite guide grooves 105 thereby being smoothly moved during the lateral sliding movement of the stop block 1330.

The invention claimed is:

1. A safety device for a quick coupler, the safety device comprising:
a quick coupler body configured to be connected to an arm of an excavator;
a fixing hook provided at a first side of the quick coupler body, engaged with a first attachment pin, and provided with a stopping protrusion having an opening-side end portion protruding upwardly;
a hitch provided at a second side of the quick coupler body, and connected to a cylinder rod of a main-cylinder to be engaged with a second attachment pin when the cylinder rod performs forward operation; and
a first locking means for preventing locking engagement between the fixing hook and the first attachment pin from being arbitrarily released,
wherein the first locking means comprises:
a first support plate fixed to the quick coupler body;
a sub-cylinder mounted to the first support plate in which a sub-rod is retracted;
a moving plate having a first support step that is connected to the sub-rod and a safety plate at a lower surface of the moving plate, and disposed to be moveable in a sliding manner toward an upper side of the fixing hook; and
at least one DIE-spring fixed to the first support plate by a support means, and transmitting an elastic force to allow the moving plate to be positioned at the upper side of the fixing hook, and
wherein the support means comprises:
a support bolt passing through the DIE-spring to be locked to the first support plate and to support a first end of the DIE-spring; and
a locking step protruding from an upper surface of the moving plate, coupled to the support bolt that passes therethrough, and supporting a second end of the DIE-spring.

2. The safety device of claim 1, wherein the DIE-spring comprises a first and a second DIE-springs which are spaced apart from each other, and each of the first and second DIE-springs is a compression spring.

3. The safety device of claim 1, wherein, when the safety plate is positioned at the upper side of the fixing hook, a lower surface of the safety plate is positioned at a height where the safety plate interferes with the first attachment pin along with the stopping protrusion so that the first attachment pin is prevented from being released from engagement with the fixing hook.

4. The safety device of claim 1, wherein the quick coupler body is provided with a guide groove at opposite inner surfaces of the quick coupler body, respectively, the guide groove guiding sliding movement of the moving plate.

5. The safety device of claim 1, further comprising:
a first elastic spring in which one end of the first elastic spring is supported by a base step provided in an outer circumference of the main-cylinder, for supplying an elastic force toward the hitch.

6. A safety device for a quick coupler, the safety device comprising:
a quick coupler body configured to be connected to an arm of an excavator;
a fixing hook provided at a first side of the quick coupler body, engaged with a first attachment pin, and provided with a stopping protrusion having an opening-side end portion protruding upwardly;
a hitch provided at a second side of the quick coupler body, and connected to a rod member of a cylinder to be engaged with a second attachment pin when the rod member performs forward operation; and
a second locking means for preventing engagement between the fixing hook and the first attachment pin from being arbitrarily released,
wherein the second locking means comprises:
a second support plate fixed to a first side of the quick coupler body;
a support bolt in which one end portion of the support bolt is locked to the second support plate;
a stop block having a second support step at an upper part of the stop block thereby allowing the support bolt to pass therethrough, with a blocking portion protruding downwardly from a lower part thereof;
a support spring coupled to the support bolt, supported by a head portion of the support bolt and the second support step, and having an elastic force to push the stop block toward an upper side of the fixing hook; and
a transport means for moving an outer cylinder block connected to a cylinder housing of the cylinder during clockwise rotation of the hitch, to move the stop block toward the upper side of the fixing hook depending on movement of the outer cylinder block, and
wherein the transport means comprises:
a frame pin coupled to the first side of the quick coupler body and coupled to an end of the cylinder housing to rotate the cylinder;
a stopper fixed to the second side of the quick coupler body, and limiting a rotational angle of the hitch when the rod member is retracted;
the outer cylinder block covering the cylinder housing, configured to move in a sliding manner toward the hitch from the frame pin when the stopper restricts rotation of the hitch due to the retracted rod member, and configured to move toward the frame pin when the rod member is extended;
an inner cylinder block disposed to cover the rod member in which a first side of the inner cylinder block is connected to the hitch by a pin and a second side thereof is disposed inside the outer cylinder block;
a first link member in which a first side of the first link member is connected to the outer cylinder block so that the first link member and the outer cylinder block are configured to move in conjunction with each other; and
a second link member in which a first side of the second link member is connected to a second side of the first link member by a sliding pin and a second side thereof is integrally connected to the stop block.

7. The safety device of claim 6, wherein, when the stop block is positioned at the upper side of the fixing hook, a lower surface of the blocking portion is positioned at a height at which the blocking portion interferes with the first attachment pin along with the stopping protrusion so that the first attachment pin is prevented from being released from engagement with the fixing hook.

8. The safety device of claim 6, wherein the quick coupler body is provided with a guide groove at each of opposite inner surfaces of the quick coupler body, the guide groove supporting opposite portions of the stop block and guiding lateral sliding movement of the stop block.

9. The safety device of claim 6, further comprising:
a second elastic spring in which a first end of the second elastic spring is supported by a base step provided in an outer circumference of the cylinder housing and a second end thereof is supported by the inner cylinder block, for supplying an elastic force toward the hitch.

* * * * *